(12) United States Patent
Doyle

(10) Patent No.: US 9,031,796 B2
(45) Date of Patent: May 12, 2015

(54) CONTINUOUS FLOW STRUCTURAL HEALTH MONITORING SYSTEM AND METHOD

(75) Inventor: Martin Doyle, Dianella (AU)

(73) Assignee: Structural Monitoring Systems Ltd., Osborne Park, Western Australia (AU)

(*) Notice: Subject to any disclaimer, the term of this patent is extended or adjusted under 35 U.S.C. 154(b) by 735 days.

(21) Appl. No.: 13/104,411

(22) Filed: May 10, 2011

(65) Prior Publication Data

US 2012/0232807 A1    Sep. 13, 2012

Related U.S. Application Data

(63) Continuation of application No. 12/865,565, filed as application No. PCT/AU2009/000109 on Jan. 30, 2009, now abandoned.

(30) Foreign Application Priority Data

Jan. 31, 2008    (AU) ................ 2008900422

(51) Int. Cl.
*G01B 5/28* (2006.01)
*B64C 27/00* (2006.01)
*B64D 45/00* (2006.01)

(52) U.S. Cl.
CPC ....... *B64C 27/007* (2013.01); *B64D 2045/0085* (2013.01)

(58) Field of Classification Search
None
See application file for complete search history.

(56) References Cited

U.S. PATENT DOCUMENTS

| 4,135,386 | A | | 1/1979 | Peterson et al. | |
| 4,304,135 | A | * | 12/1981 | Peterson et al. | 73/799 |
| 4,503,710 | A | * | 3/1985 | Oertle et al. | 73/763 |
| 5,770,794 | A | | 6/1998 | Davey | |
| 6,539,776 | B2 | | 4/2003 | Davey | |
| 6,591,661 | B2 | | 7/2003 | Davey | |
| 6,708,882 | B1 | | 3/2004 | Bley | |
| 6,715,365 | B2 | | 4/2004 | Davey | |
| 7,942,032 | B2 | * | 5/2011 | Walker et al. | 73/12.08 |

FOREIGN PATENT DOCUMENTS

| WO | 02/21096 | 3/2002 |
| WO | 2007/112511 | 10/2007 |
| WO | 2008/067586 | 6/2008 |

* cited by examiner

*Primary Examiner* — Aditya Bhat
(74) *Attorney, Agent, or Firm* — Cesari and McKenna, LLP

(57) ABSTRACT

A continuous flow structural health monitoring system for detecting a crack in a component or structure comprises a pressure source, a fluidic circuit and a measurement system. The pressure source supplies fluid at a regulated pressure relative to ambient pressure. The fluidic circuit couples at one end to the pressure source and opens at an opposite end to ambient pressure. The pressure source produces a substantially constant and continuous flow of fluid through the fluidic circuit. The fluidic circuit has a first passage having a first surface portion of the component or structure. The measurement system monitors perturbations in the flow of fluid through the first passage to provide an indication of structural health of the component or structure.

12 Claims, 4 Drawing Sheets

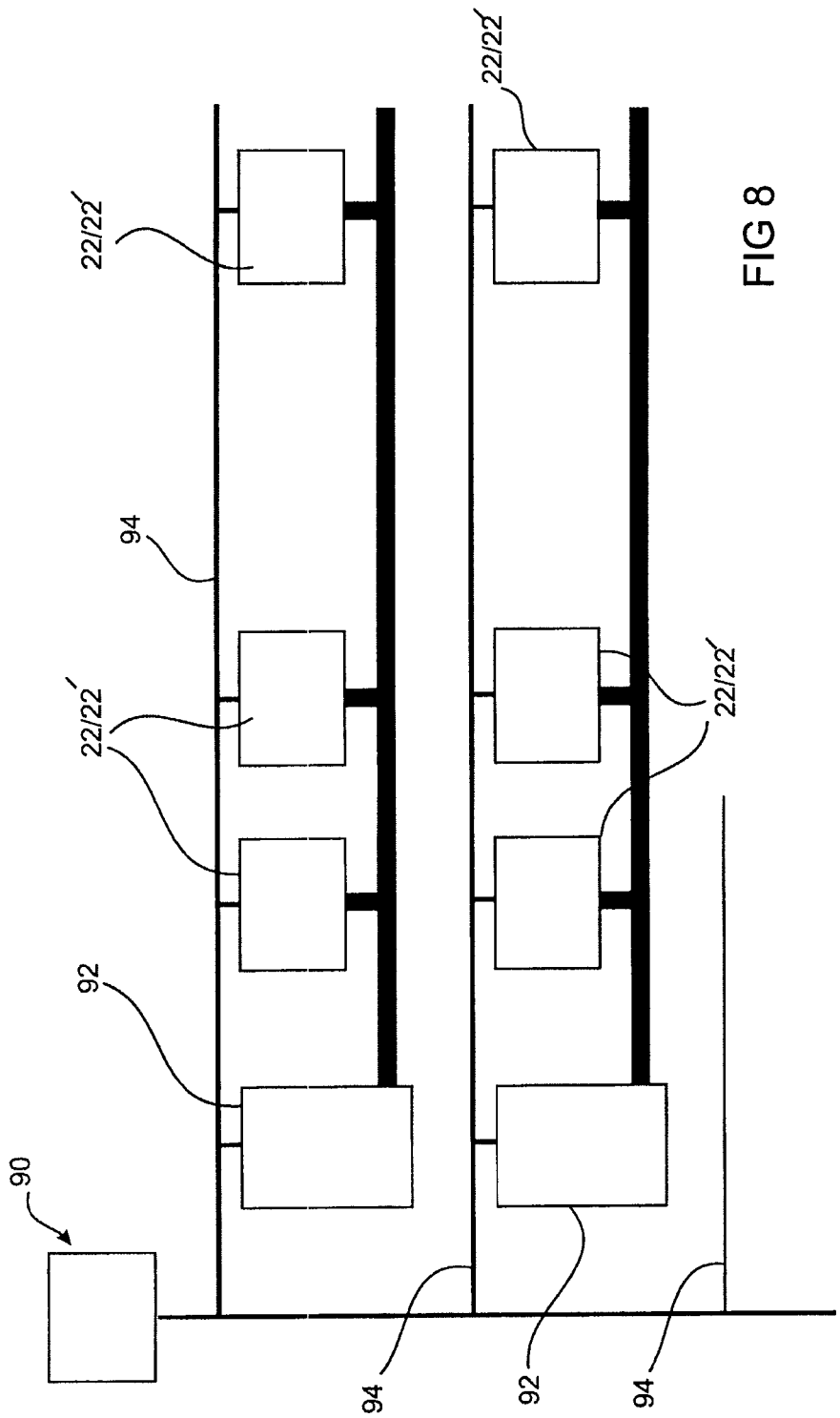

CONTINUOUS FLOW STRUCTURAL HEALTH MONITORING SYSTEM AND METHOD

CROSS REFERENCE TO RELATED APPLICATIONS

This application is a continuation of U.S. application Ser. No. 12/865,565, filed on Jul. 30, 2010, which is a national stage application of PCT/AU2009/000109 filed Jan. 30, 2009, which claims the priority of Australian application no. 2008900422, filed on Jan. 31, 2008. The contents of all applications are hereby incorporated by reference in their entirety.

FIELD OF THE INVENTION

The present invention relates to the field of structural health monitoring of components and structures, and in particular, but not exclusively, to such systems and methods as applicable for in flight structural health monitoring of air craft.

BACKGROUND OF THE INVENTION

Applicant has conceived numerous inventions relating to structural integrity monitoring and structural health monitoring. Such inventions may be used to detect the formation, and/or monitor the propagation, of cracks on or in a component or structure. Examples of such inventions are provided in various patents including U.S. Pat. No. 5,770,794; U.S. Pat. No. 6,539,776; U.S. Pat. No. 6,591,661; U.S. Pat. No. 6,715,365; and, U.S. Pat. No. 6,708,882.

By and large, these inventions require the use of a substantially sealed fluidic circuit which is in communication at one end with a pressure source and an opposite end with a cavity sealed onto a surface of the structural component.

The present invention arises from further development by Applicant in the above field of technology.

It is to be understood that, if any prior art publications referred to herein, such reference does not constitute an admission that the publication forms part of the common general knowledge in the art, in Australia or in any other country.

SUMMARY OF THE INVENTION

One aspect of the invention provides a continuous flow structural health monitoring system for a component or structure, the system comprising:
  a pressure source providing a supply fluid at a regulated pressure difference relative to ambient pressure;
  a fluidic circuit which is coupled at one end to the pressure source and is open at an opposite end to ambient pressure, wherein the pressure source produces a substantially constant and continuous flow of fluid through the fluidic circuit, the fluidic circuit having a first passage constituted in part by a first surface portion of the component or structure; and,
  a measurement system that continuously monitors for perturbations in the substantially constant flow of fluid through the first passage to provide an indication of structural health of the component or structure.

The monitoring system may monitor for perturbations in the fluid flow by monitoring for a change in conductance of a fluidic load on the first passage.

The measurement system may be arranged to facilitate the calculation of conductance of a $C_{crack}$ in the first surface portion that provides fluid communication between the first passage and ambient pressure, the measurement system facilitating calculation of the conductance of the crack on the basis of a difference between a known conductance of the fluidic load and a measured conductance of the fluidic load.

A second aspect of the invention provides a continuous flow structural health monitoring system for a component or structure, the system comprising:
  a pressure source providing a supply fluid at a regulated pressure difference relative to ambient pressure;
  a fluidic circuit which is coupled at one end to the pressure source and is open at an opposite end to ambient pressure, wherein the pressure source produces a substantially constant and continuous flow of fluid through the fluidic circuit, the fluidic circuit having a passage constituted in part by a first surface portion of the component or structure; and,
  a measurement system that facilitates calculation of conductance of a $C_{crack}$ in a first surface portion that provides fluid communication between the first passage and ambient pressure.

The fluidic circuit may comprise a fluidic load connected between the first passage and the opposite end of the fluidic circuit.

The fluidic load may comprises a first flow restrictor of a conductance $C_{24}$ in series connection in the fluidic circuit between the first passage and the opposite end of the fluidic circuit.

The measurement system may measure ambient pressure and a pressure between the first passage and the pressure source and utilises these pressure measurements to calculate conductance of the $C_{crack}$.

The fluidic circuit may comprise a second flow restrictor of a known conductance $C_{26}$ coupled to the first passage on a side opposite the first flow restrictor.

The measurement system may measures a pressure $P_T$ between a pressure source and the second flow restrictor, a pressure $P_s$ between the second fluidic load and the first passage, and ambient pressure $P_A$ and provides a calculation of crack conductance $C_{crack}$ as:

$$c_{CRACK} = \frac{P_S^2 - P_T^2}{P_A^2 - P_S^2} \times c_{26} - c_{24}$$

The fluidic circuit may comprise a second passage constituted in part by the first surface portion of a component or structure, wherein the second passage is connected between the first passage and the opposite end of the fluidic circuit.

The second fluid passage may be located relative to the first fluid passage wherein a crack on the first surface portion that extends from the first passage to the second passage provides fluid communication between the first passage and second fluid passage.

The first passage may comprise a groove or channel formed on a first surface of a sensor, wherein when the first surface is sealed to the first surface portion the first groove or channel together with the first surface portion forms the first passage.

The second passage may comprise a second groove or channel formed on the first surface of the sensor wherein when the first surface of the sensor is sealed to the first surface portion the second groove or channel forms the second passage.

The structural health monitoring system may comprise a reference fluidic circuit which is coupled at one end to the pressure source and is open at an opposite end to ambient pressure, wherein the reference circuit has fluidic characteristics matched to fluidic characteristics of the fluidic circuit; and wherein the measurement system utilises pressure measurements in the reference circuit to provide common mode noise cancellation in monitoring for perturbations in the flow of fluid through the first passage and in calculation of conductance of the crack.

The reference fluidic circuit may comprise a reference passage of matched fluidic characteristics to the first passage wherein the reference passage is located near the first passage and is fluidically isolated from the first surface portion of the component or structure.

The measurement system may provide a calculation of crack conductance as:

$$c_{CRACK} = c_{26} \times \left( \frac{P_{S1}^2 - P_T^2}{P_A^2 - P_{S1}^2} - \frac{P_{S3}^2 - P_T^2}{P_A^2 - P_{S3}^2} \right)$$

wherein
- $P_{S1}$ is a measured pressure between the second flow restrictor and the first passage;
- $P_T$ is fluid source pressure;
- $P_{S3}$ is fluidic pressure measured between the pressure source and the reference passage in the reference circuit;
- $P_A$ is measured ambient pressure.

In one embodiment of the structural health monitoring system the pressure source may comprise a pump and the measurement system measures pump speed, wherein a variation in the measured pump speed provides an indication of a perturbation in fluid flow through the first passage.

When the fluidic load comprises a first flow restrictor of a conductance $C_{24}$ in series connection in the fluidic circuit between the first passage and the opposite end of the fluidic circuit the measurement system measures fluidic source pressure $P_T$ and ambient pressure $P_A$ and calculates crack conductance as:

$$c_{CRACK} = 2k \times \frac{P_T}{P_A^2 - PT^2} \times \text{rpm} - c_{24}$$

when $P_T < P_A$, and $$c_{CRACK} = 2k \times \frac{P_A}{P_T^2 - P_A^2} \times \text{rpm} - c_{24}$$

when $P_T > P_A$, and where rpm is the measured speed of the pump.

A third aspect of the invention provides a continuous structural health monitoring system comprising:
- a pump providing a supply fluid at a regulated pressure difference relative to ambient pressure;
- a fluidic circuit which is coupled at one end to the pump and is open at an opposite end to ambient pressure, wherein the pump produces a substantial constant and continuous mass flow of fluid through the fluidic circuit, the fluidic circuit having a first passage constituted in part by a first surface portion of the component or structure; and
- a pump regulating and measurement system that continuously monitors pump speed and pump pressure and controls pump speed to maintain fluid pressure in the first passage at a substantially constant level wherein variations in pump speed provide an indication of structural health of the component or structure.

In this aspect of the structural health monitoring system, the fluidic circuit may comprise a first flow restrictor of a conductance $C_{24}$ in fluid communication between the first passage and ambient pressure.

The measurement system may measure fluidic source pressure $P_T$ and ambient pressure $P_A$ and calculates crack conductance as:

$$c_{CRACK} = 2k \times \frac{P_T}{P_A^2 - PT^2} \times \text{rpm} - c_{24}$$

when $P_T < P_A$, and $$c_{CRACK} = 2k \times \frac{P_A}{P_T^2 - P_A^2} \times \text{rpm} - c_{24}$$

when $P_T > P_A$, and where rpm is the measured speed of the pump.

A fourth aspect of the invention provides a continuous structural monitoring system comprising:
- a fluidic circuit having a first end, a second end, and a first passage formed at least in part by a portion of a surface being monitored by the system, with the passage intermediate the first end and the second end, and the second end vented to ambient pressure $P_A$, the circuit comprising a fluidic load having a first flow restrictor of a know fluid flow conductance $C_{24}$ connected between the first passage and the second end of the circuit;
- a pressure source, providing fluid at a regulated pressure difference relative to ambient pressure, coupled with the first end and providing a continuous and substantially constant fluid flow through the circuit;
- a measurement system continuously measuring at least: pressure $P_T$ at a location between the pressure source and the at least one first passage; and the ambient pressure $P_A$, and calculating a value of conductance to fluid flow of the fluidic load using the measured values of $P_A$ and $P_T$ as an indication of integrity of the structure.

The measurement system may be arranged to facilitate the calculation of conductance of a $C_{crack}$ in the first surface portion that provides fluid communication between the first passage and ambient pressure, the measurement system facilitating calculation of the conductance of the crack on the basis of a difference between a known conductance of the first flow restrictor and a measured conductance of the fluidic load.

A fourth aspect of the invention provides an in-flight continuous structural monitoring system for a structure or component of an aircraft comprising continuous structural monitoring system according to any one of the first third aspects of the invention and wherein the surface is a surface of a cavity from on or in the structure or component.

A first aspect of the invention provides a method of continuous structural monitoring comprising:
- providing a fluidic circuit comprising: a first passage which is constituted at least in part by a portion of a surface of a structure or component being monitored; and, a series connected first flow restrictor of a know conductance $C_{24}$, the circuit having first and second ends wherein the second end of the fluidic circuit is vented to ambient pressure;
- establishing a substantially constant fluid flow through the fluidic circuit; and, calculating a value of conductance of a crack that provides a fluid flow path between the first passage and ambient pressure.

Establishing a substantially constant fluid flow may comprise providing fluid at a regulated pressure difference relative to ambient pressure.

Providing the regulated pressure difference may comprise providing a pump and calculating the value of conductance of the crack may comprise measuring ambient pressure $P_A$, measuring fluid pressure provided by the source $P_T$, measuring pump speed rpm and determining crack conductance $C_{CRACK}$ $$c_{CRACK} = 2k \times \frac{P_T}{P_A^2 - PT^2} \times \text{rpm} - c_{24}$$

when $P_T < P_A$, and $$c_{CRACK} = 2k \times \frac{P_A}{P_T^2 - P_A^2} \times \text{rpm} - c_{24}$$

when $P_T > P_A$

In an alternate embodiment of this aspect of the invention the method may comprise connecting a second flow restrictor of conductance $C_{26}$ into the circuit on a opposite side of the first passage; wherein calculating a value of conductance of a crack comprises measuring ambient pressure $P_A$, measuring pressure $P_S$ between the first flow restrictor and the first passage, measuring pressure $P_T$ between the first flow restrictor and the first end of the circuit, and calculating crack conductance $C_{CRACK}$ as $$c_{CRACK} = \frac{P_S^2 - P_T^2}{P_A^2 - P_S^2} \times c_{26} - c_{24}$$

where $c_{26}$ and $c_{24}$ are the conductances of the first and second flow restrictors respectively.

BRIEF DESCRIPTION OF THE DRAWINGS

Embodiments of the present invention will now be described by way of example only with reference to the accompanying drawings in which.

DETAILED DESCRIPTION OF PREFERRED EMBODIMENTS

Figure 1:
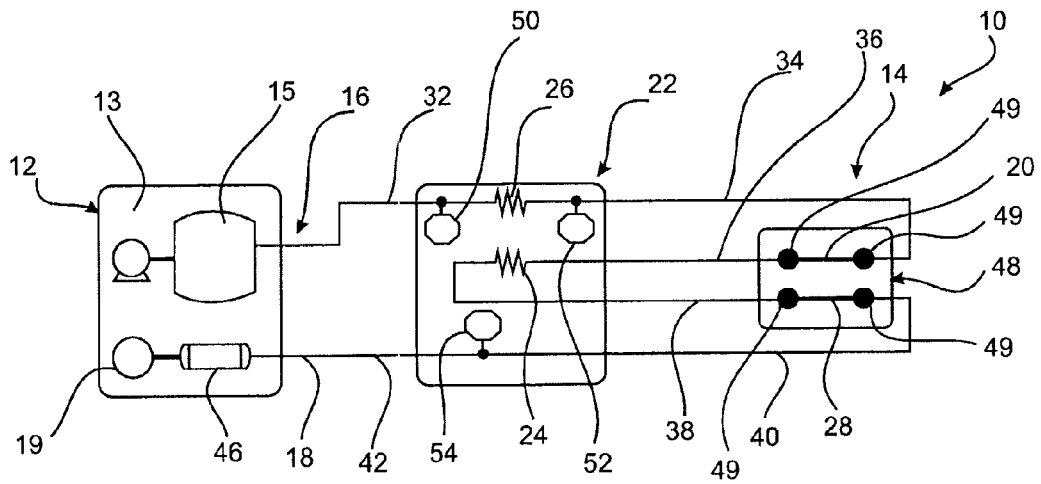
FIG. 1 is a schematic representation of a first embodiment of a continuous flow structural health monitoring system in accordance with the present invention.
Figure 2:
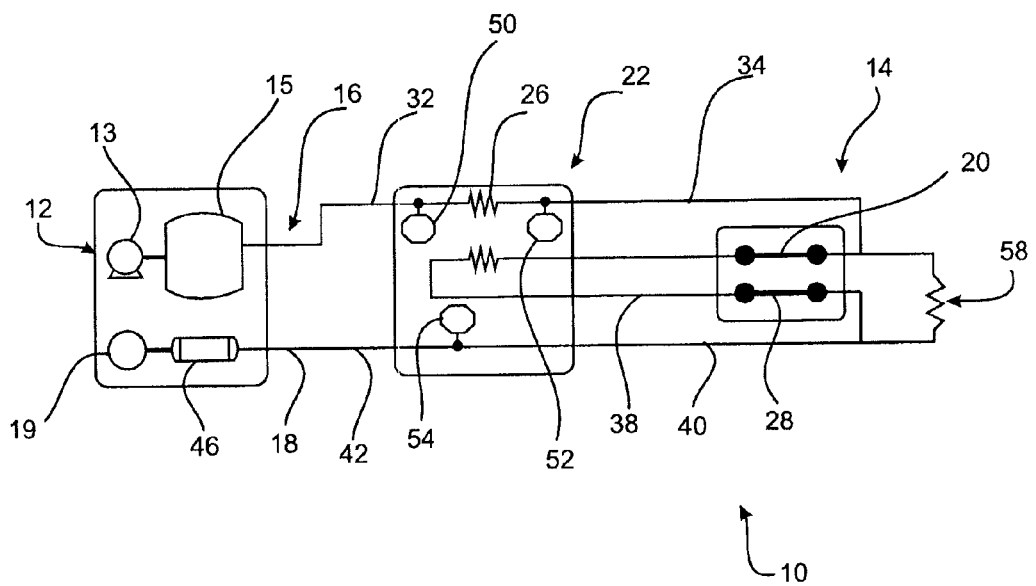
FIG. 2 is a schematic representation of the system shown in FIG. 1 after the formation of a crack or fault in a component or structure that the system is monitoring.

FIGS. 1 and 2 depict a first embodiment of a continuous flow structural health monitoring system 10 for monitoring the structural health of a component or structure, such as for example a lap joint (not shown). The system 10 comprises a pressure source 12 providing a supply of fluid (typically air) at a regulated pressure difference relative to ambient pressure. A fluidic circuit 14 is coupled at one end 16 to the pressure source 12 and is open at an opposite end 18 to ambient pressure via an atmosphere vent 19. The pressure source 12 produces a substantially constant and continuous flow of air through the fluidic circuit 14. The circuit includes a passage 20 which is constituted at least in part by a first surface portion of the component or structure being monitored. A flow measurement system or module 22 continuously monitors for perturbations in the substantially constant flow of fluid through the first passage 20 to provide an indication of structural health of the component or structure. In this regard, as described in greater detail below with reference to FIG. 2, in the event that a crack 58 develops and propagates from or into the first surface portion which forms part of the first passage 20 and extends to form a fluidic bridge to the ambient atmosphere, there will be an increase in the fluid flow through the circuit 14 and thus through the passage 20. This increase of flow will occur irrespective of whether the pressure source 12 is a relative vacuum or a relative positive source, but the direction of flow will be in opposite directions for each. Thus changes in the substantially constant air flow through the circuit 14 and/or passage 20 may be indicative of the structural health of the structure or component in question.

Looking more closely at the specific embodiment shown in FIGS. 1 and 2, system 10 comprises a first fluidic load in the form of a flow restrictor 24 coupled in the circuit 14 between the passage 20 and the end 18; an additional fluidic load in the form of a flow restrictor 26 connected in the circuit 14 in series between the end 16 of the circuit and the passage 20; and, an additional passage 28 coupled in series between the flow restrictor 24 and the end 18.

The fluidic circuit 14 also comprises a plurality of tubes or conduits 32-42, with tube 32 fluidically connecting the pressure source 12 to the flow restrictor 26, tube 34 fluidically connecting the flow restrictor 26 to the passage 20, tube 36 fluidically connecting the passage 20 to the flow restrictor 24, tube 38 fluidically connecting the flow restrictor 24 to the passage 28, tube 40 connecting the passage 28 to the measurement system/module 22 and a tube 42 fluidically connecting the measurement module 22 to the ambient vent 19. A filter 46 is provided between the tube 42 and the vent 19 to prevent the ingress of foreign matter (in the event that the pressure source 12 is a relative negative source, or the source is inactive) which may otherwise block or adversely effect the flow of fluid through the circuit 14.

The pressure source 12 comprises a pump 13 and a regulator 15 which controls, or provides a stable difference in, fluid pressure of the source 12 referenced to ambient pressure. Thus when there is a change in ambient pressure there will be a corresponding change in the pressure source 12 to maintain the regulated difference.

Passages 20 and 28 may be formed as part of a sensor 48 that is adhered to the surface of the component or structure being monitored. The sensor 48 may be in the form of sensors developed by present applicant and as described in for example U.S. Pat. No. 6,715,365 and U.S. Pat. No. 6,539,776; as well as International publication no. WO 2007/115363, the contents of which are incorporated herein by way of reference. However in short, the sensor 48 may be in the form of a pad of resilient material in which is formed two separate and spaced apart grooves or channels that, in this embodiment, lie wholly within the footprint or boundary of the sensor 48. The grooves or channels open onto a bottom surface of the sensor 48 which in turn is adhered onto the surface of the component or structure being monitored. Connectors 49 allow the conduits 34, 36, 38 and 40 to connect to opposite ends of the respective grooves or channels. The grooves or channels when sealed against the surface of the component or structure being monitored form the respective passages 20 and 28. Thus, fluid flowing through the circuit 14 when it flows through the passages 20 and 28 also flows against respective spaced apart surface portions of the component or structure being monitored.

The flow restrictors 24 and 26 may be in the form of lengths of small bore tubing having a known resistance to fluid flow. Each of the restrictors 24 and 26 may form part of the measurement module 22 as an integral unit. The system 10 also includes a number of pressure sensors 50, 52 and 54, which may also be formed as part of the measurement module 22. The sensor 50 taps into a point between the end 16 of the pressure source 12 and the restrictor 26 and provides a measure of fluid pressure in the tube 32 which is the same as the pressure of source 12. This pressure is designated as $P_T$. The pressure sensor 52 provides a measure of pressure on the side of the flow restrictor 26 opposite the source 12, and is designated as pressure $P_S$. The pressure sensor 54 provides a measure of pressure in the portion of the tube 42 vented to the atmosphere, and thus provides atmospheric pressure, is designated as $P_A$.

In the event that there is no crack in the first surface portion which forms part of the passage 20 the flow of fluid through the circuit 14 remains constant and thus there are no substantive perturbations in the air flow through the passage 20 and circuit 14. This may be reflected by a relationship between pressures measured by the sensors 50, 52 and 54 which remains constant and dependent solely upon the value of the resistance (and thus by the conductance) to flow, of the flow restrictors 24 and 26 as follows.

Assume for present that the pressure source 12 provides a vacuum that is regulated to be at a stable level referred to ambient pressure. Air flows continuously from the ambient vent 19 through the filter 46, tube 42, tube 40, passage 28, tube 38, flow restrictor 24, tube 36, passage 20, tube 34, flow restrictor 26, relatively negative pressurized tube 32, to the source 12. The amount of air flowing is mainly determined by: the flow restrictors 24 and 26 which can have the same value or different values; and, the pressure difference between the tube 32, and the tube 42 (i.e. pressure difference between the pressure source 12 and ambient pressure, i.e. $P_T-P_A$). In this regard, the passages 20 and 28 as well as the tubes 32-42 are assumed to have much higher conductivity to air flow than the flow restrictors and accordingly the pressure drop across the passages 20 and 28 is negligable, i.e. $P'_A = P_A$, where the $P'_A$ is the pressure measured on the ambient side of flow restrictor 24. Hence, assuming there is no crack then the following relationship exists in terms of the conductance to air flow of the flow restrictors 24 and 26:

$$\frac{C_{24}}{C_{26}} = \frac{P_S^2 - P_T^2}{P_A^2 - P_S^2} \quad (1)$$

Where $C_{24}$ and $C_{26}$ are the volumetric conductivity of the flow restrictors 24 and 26 respectively, determined by Poiseuilles' Law. The derivation of this relationship is set out below.

Assume that the temperature T is the same over the entire system 10 and there is no material leakage in the system, i.e. crack 58 does not exist.

In a vacuum application $P_T$, $P_S<P_A$ and the air mass flow entering at the vent 19 at pressure $P_A$ flows through the flow restrictors 24 and 26 and leaves the system 10 at the pump 13 at pressure $P_T$.

The mass flow $\dot{m}$ of air through the system 10, and thus through the restrictors 24 and 26, is constant, thus:

$$\dot{m} = \dot{m}_{24} = \dot{m}_{26}$$

On the way through the system 10 the volumetric flow of air $\dot{V}$ changes, caused by the different air density $\rho$ ($\dot{m} = \rho \times \dot{V}$).

$$\dot{m} = \rho_{24} \dot{V}_{24} = \rho_{26} \times \dot{V}_{26} \quad (2)$$

The different air density is due to different pressures in different parts of the system 10. From the ideal gas law, one can derive the density as a function of the absolute pressure P:

$$P \times V = m \times R \times T$$

where V is volume, m is mass, R is the gas constant and T is absolute temperature $$\text{Density } \rho = \frac{m}{V} = \frac{P}{RT}$$

Now, one can replace the density in equation (2) with:

$$\dot{m} = \frac{P_{24}}{RT} \times \dot{V}_{24} = \frac{P_{26}}{RT} \times \dot{V}_{26}$$

The term RT is constant in the system and is cancelled out in the equation, thus:

$$P_{24} \times \dot{V}_{24} = P_{26} \times \dot{V}_{26}$$

The pressure $P_{24}$ in flow restrictor 24 can be approximated as $(P_A + P_S)/2$ The pressure $P_{26}$ in flow restrictor 26 can be approximated as $(P_S + P_T)/2$ Thus:

$$\frac{P_A + P_S}{2} \times \dot{V}_{24} = \frac{P_S + P_T}{2} \times \dot{V}_{26}$$

After cancelling the common denominator 2, one gets $$(P_A + P_S) \times \dot{V}_{24} = (P_S + P_T) \times \dot{V}_{26} \quad (3)$$

The relationship between the volumetric flow through a tube (flow restrictor) and the pressure drop over the tube can be described by the Poiseuilles' Law:

$$r_{FR} = \frac{\Delta P_{FR}}{\dot{V}_{FR}} = \frac{8}{\pi} \times \mu \times \frac{l}{(ID/2)},$$

where $r_{FR}$ is the flow resistance of any restrictor

The pressure drop $\Delta P_{FR}$ across either flow restrictor is the difference of the absolute pressures at its opposite ends. Applying this to the two flow restrictors one gets $$r_{24} = \frac{\Delta P_{24}}{\dot{V}_{24}} = \frac{(P_A - P_S)}{\dot{V}_{24}}$$

$$r_{26} = \frac{\Delta P_{26}}{\dot{V}_{26}} = \frac{(P_S - P_T)}{\dot{V}_{26}}$$

Solving the two equations for $\dot{V}_{24}$ and $\dot{V}_{26}$ $$\dot{V}_{24} = \frac{(P_A - P_S)}{r_{24}}$$

$$\dot{V}_{26} = \frac{(P_S - P_T)}{r_{26}}$$

Inserting these in equation (3) and rearranging $$(P_A + P_S) \times \frac{(P_A - P_S)}{r_{24}} = (P_S + P_T) \times \frac{(P_S - P_T)}{r_{26}}$$

$$\frac{P_A^2 - P_S^2}{r_{24}} = \frac{P_S^2 - P_T^2}{r_{26}}$$

$$\frac{r_{26}}{r_{24}} = \frac{P_S^2 - P_T^2}{P_A^2 - P_S^2}$$

Replacing the flow resistance $r_{FR}$ by their conductances $c_{FR} = 1/r_{FR}$, the final equation is:

$$\frac{c_{24}}{c_{26}} = \frac{P_A^2 - P_T^2}{P_A^2 - P_S^2}$$

This equation is valid for both vacuum and over-pressure (i.e. positive pressure) applications. For over-pressure the nominator and the denominator become negative, which cancels out.

Now however consider the situation in FIG. 2 where a crack 58 has developed in the surface of the component or structure where the crack 58 provides a fluid flow path to either ambient pressure or the passage 28 which, is vented to ambient pressure via the tubes 40 and 42. The crack 58 creates an additional conductivity to air flow between the passage 20 and ambient pressure (either directly or via the passage 28). The crack conductance $C_{crack}$ shunts across the flow restrictor 24. This crack changes the fluidic load on the passage 20. Due to the parallel configuration of the crack 58 and the flow restrictor 24, the total resistive load to fluid flow decreases, i.e. the effective conductance to fluid flow increases. Now, having regard to equation (1) above, the conductance $C_{24}$ is now replaced by the sum of $C_{crack}+C_{24}$ which corresponds to the parallel configuration of the flow restrictor 24 and the crack 58. Hence, $$\frac{c_{CRACK} + c_{24}}{c_{26}} = \frac{P_S^2 - P_T^2}{P_A^2 - P_S^2}$$

After solving for $C_{crack}$ the equation becomes:

$$c_{CRACK} = \frac{P_S^2 - P_T^2}{P_A^2 - P_S^2} \times c_{26} - c_{24} \quad (4)$$

With the known (by design) conductivity $C_{24}$ and $C_{26}$ of the flow restrictors 24, 26 and the measured pressure values of $P_A$, $P_S$ and $P_T$, the conductivity of $C_{crack}$ can be calculated. The value of $C_{crack}$ can be expressed in CI (Conductivity Index), where:

$$1CI = 10^{-15} \frac{m^3}{Pa \times s}.$$

Thus when there is no crack 58, the value of $C_{crack}$ (i.e. the conductance of the crack) is in an ideal or theoretical system, zero. But in practice due to the effects of noise, material permeability, slight mismatching in the characteristics of the restrictors 24, 26 and imperfections in sealing, $C_{crack}$ will have a non zero value when no crack is present. This may be considered to be a base noise level.

When the crack 58 occurs, the conductance of the crack $C_{crack}$ is determined by the measurement system 22 by measurement of the pressures $P_T$, $P_S$ and $P_A$ and utilisation of the known conductances of the restrictors 24 and 26. An increase in the value $C_{crack}$ from the base noise level indicates the presence of a crack and is manifested by a change in the flow of fluid through the circuit 14 from the constant reference level. The larger the value of the measured crack conductance $C_{crack}$ above the base noise level the larger the crack.

Sensitivity of the system may be enhanced by several orders of magnitude by provision of a differential system in which two substantially identical fluidic circuits are coupled between the pressure source 12 and the ambient vent 19. Such a system is depicted in FIG. 3 in which features identical to those depicted and described in relation to FIG. 1 utilise the same reference numbers, and features of a second fluidic circuit that perform the same function as those of the first circuit have the same reference number but with the addition of a prime (') symbol.

Figure 3:
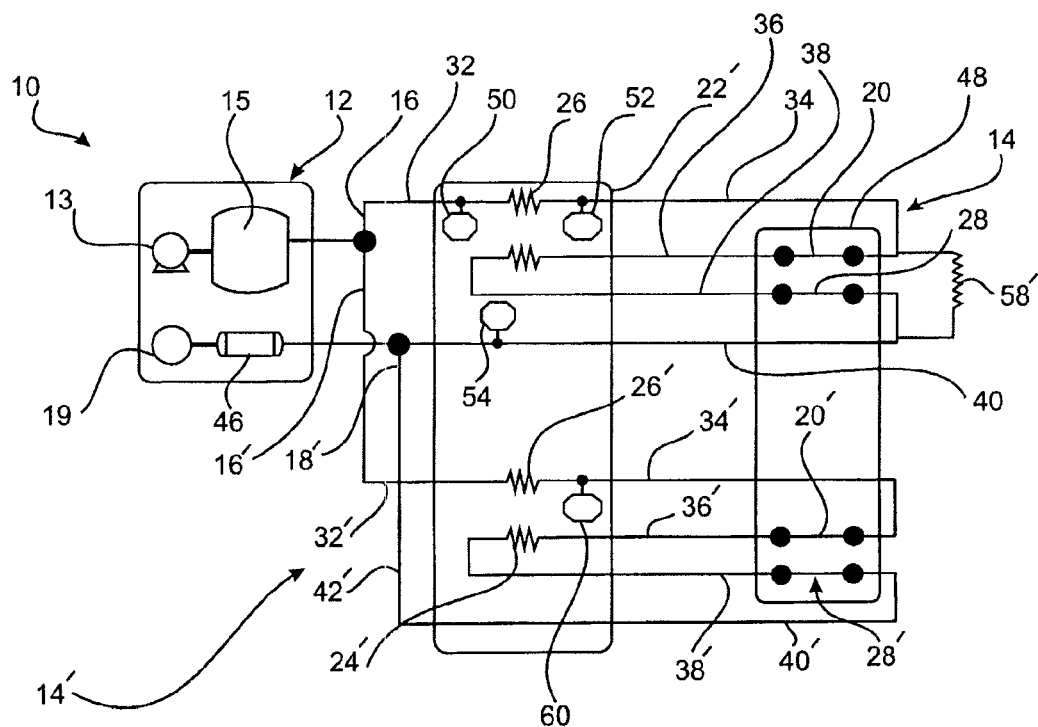
FIG. 3 is a schematic representation of a second embodiment of the continuous flow structural health monitoring system.

The embodiment system 10 depicted in FIG. 3 differs from that depicted in FIG. 1 by the addition of a duplicate reference fluidic circuit 14'. That is, the system 10 in FIG. 3 comprises a fluidic circuit 14 identical to the circuit 14 depicted in FIG. 1 but in addition a reference circuit 14' extending from an end 16' in fluidic communication with the pressure source 12 to an opposite end 18' in fluid communication with the ambient vent 19. Starting from the vent 19, the circuit 14' also comprises the following series connected elements: tube 42', measurement module 22', tube 40', passage 28', tube 38', flow restrictor 24', tube 36', passage 20', tube 34', flow restrictors 26', and tube 32' coupled with the pressure source 12. A pressure sensor 60 provides a measure of pressure on a side of flow restrictor 26' adjacent to the passage 20', which is designated as $P_{S3}$.

The circuit 14' and in particular its individual components, flow restrictors 24', 26' and passages 20', 28' are formed to have matched fluidic characteristics to the circuit 14 and its corresponding individual components. However the passage 20' is formed as part of the bulk material of the sensor 48' and does not have a surface that includes a portion of the surface of the component or structure being monitored. Accordingly the passage 20' cannot be penetrated by a crack.

Assuming that the characteristics of the flow restrictors 24 and 26 match those of flow restrictors 24' and 26' respectively, and that the characteristics of the passages 20 and 20' are also matched, then the absolute pressure $P_{S1}$ in tube 34 is equal to the pressure $P_{S3}$ in tube 34'. By locating the circuits 14 and 14' substantially adjacent to each other, all common noise and other transients for example due to variations in temperature, pressure fluctuations and permeability of the materials from which the components of the system 10 are made will generate substantially the same changes in both circuits 14 and 14'. The pressure difference $P_{S1}-P_{S3}$ eliminates all common factors i.e. in effect provides common mode noise cancellation as it is only effected by the formation and/or propagation of a crack (i.e. a fluid flow path) that extends between the passage 20 and ambient pressure.

Figure 4:
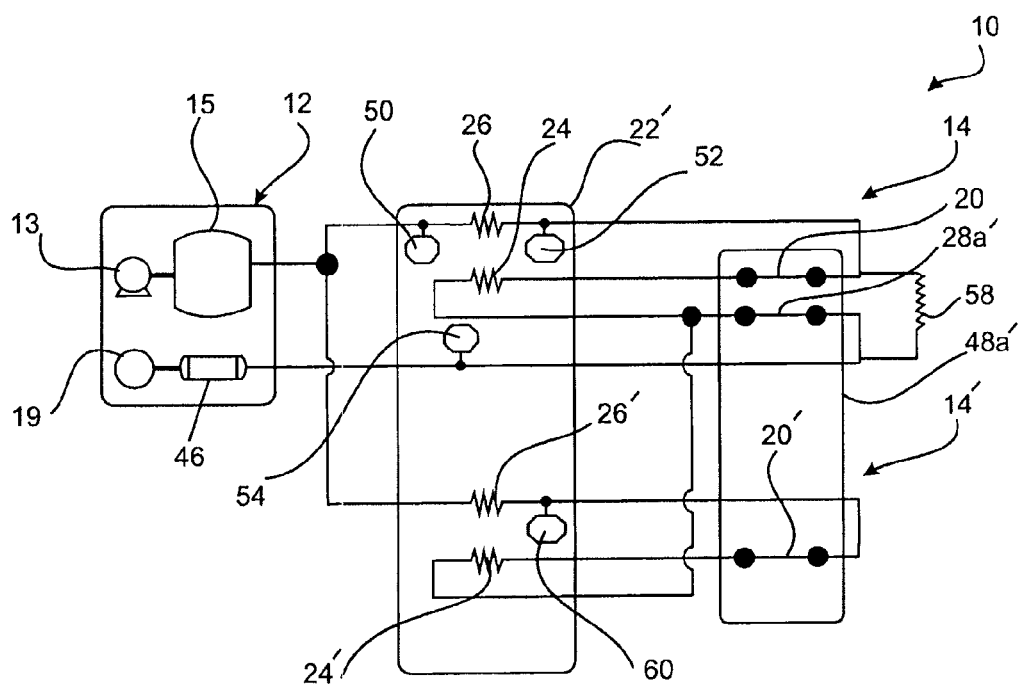
FIG. 4 depicts a third embodiment of the monitoring system, being a variation of the embodiment shown in FIG. 3.

Such a differential measuring configuration provides significantly lower $C_{crack}$ threshold levels than the system depicted in FIGS. 1 and 2. However the system configuration, and in particular the sensor 48' is more complex. The system shown in FIG. 4 provides a simplified sensor 48'$a$ in which the ambient passages 28 and 28' are cognate into a single ambient passage 28'$a$.

Assume there is a crack which creates an additional conductivity between: passages 20 and 28'$a$; or, passage 20 and ambient pressure (similar to before). The crack conductance $c_{CRACK}$ shunts flow restrictor 24. Utilising equation (3) above:

$$c_{CRACK1} = \frac{P_{S1}^2 - P_T^2}{P_A^2 - P_{S1}^2} \times c_{26} - c_{24} \quad (5)$$

Where $C_{CRACK1}$ is the mathematical conductance of a crack breaching passage 20 in a theoretically ideal system.

If a crack could breech the passage 20' and shunt across the flow restrictor 24' one can derive a similar equation:

$$c_{CRACK3} = \frac{P_{S3}^2 - P_T^2}{P_A^2 - P_{S3}^2} \times c_{26'} - c_{24'} \quad (6)$$

It must be understood however that equation (6) is a mathematical model only of a theoretical crack shunted across the flow restrictor 24'. As explained above because the passage 20' is formed internally of the bulk material of the sensor 48'$a$ it cannot be penetrated by a crack in the surface of the structure being monitored. Nevertheless taking this approach allows a very elegant method of compensating for imperfections in the calculation of $C_{crack1}$ as well as substantially reducing the effects of transients in fast changing environments because it inherently provides common mode noise rejection.

Calculating $C_{crack}=C_{crack1}-C_{crack3}$, where $C_{crack}$ is the conductance of a physical crack 58 shunted across the restriction 24, would ideally resolve to $C_{crack}=C_{crack1}$ since $C_{crack3}=0$ due to there being no crack breeching the passage 20'. In practice however ambient pressure and temperature fluctuations would give non zero values for $C_{crack1}$ and $C_{crack3}$ even when no crack is present. Assuming the passages 20 and 20' are matched in terms of their fluidic characteristics then the values for $C_{crack1}$ and $C_{crack3}$ will be substantially the same and will cancel out in the equation $C_{crack}=C_{crack1}-C_{crack3}$. This equation is developed further as follows:

$$c_{CRACK} = c_{CRACK1} - c_{CRACK3}$$

$$= \frac{P_{S1}^2 - P_T^2}{P_A^2 - P_{S1}^2} \times c_{26} - c_{24} - \frac{P_{S3}^2 - P_T^2}{P_A^2 - P_{S3}^2} \times c_{26'} + c_{24'}$$

With the matching of the flow restrictors $c_{26}=c_{26'}$ and $c_{24}=c_{24'}$:

$$c_{CRACK} = c_{26} \times \left(\frac{P_{S1}^2 - P_T^2}{P_A^2 - P_{S1}^2} - \frac{P_{S3}^2 - P_T^2}{P_A^2 - P_{S3}^2}\right) \quad (7)$$

With the known (by design) conductivity $c_{26}$ of the flow restrictor 26 and the measured pressure values of $P_A$, $P_{S1}$, $P_{S3}$ and $P_T$, the conductance $c_{CRACK}$ of crack 58 can be calculated. The conductance value of $c_{CRACK}$ can be expressed in CI, as before.

By continuously measuring $P_A$, $P_{S1}$, $P_{S3}$ and $P_T$, and continuously calculating the value of $C_{crack}$ using equation (7) above, it is possible to continuously monitor for the development and propagation of a crack that intersects the passage 20 and extends a distance sufficient to provide a fluid communication path to ambient pressure (either through passage 28'$a$ or to external ambient). Due to the differential system the value of $C_{crack}$ which would give rise to a confident indication of a crack in the surface of the component that is several orders of magnitude smaller than a crack that may be detected by the embodiment shown in FIGS. 1 and 2. Due to the direct relationship between mass flow through the circuit 14 and the calculated value of $C_{crack}$ increases in $C_{crack}$ above a base noise level (which in this embodiment is substantially less than in that of FIGS. 1 and 2) is also manifested by a change in the otherwise constant flow of fluid through the circuit 14.

Figure 5:
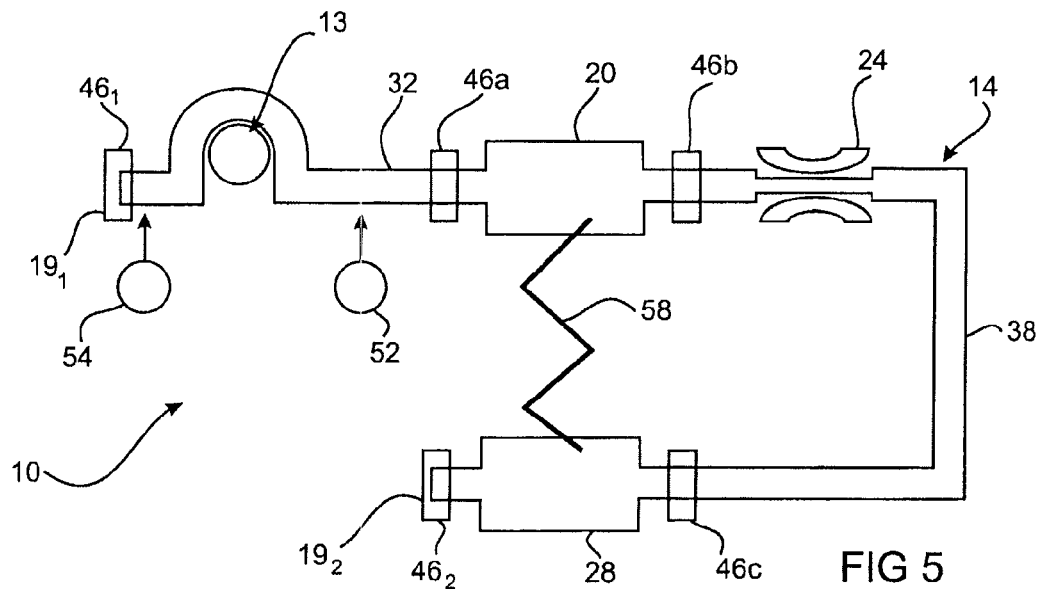
FIG. 5 is a schematic representation of a fourth embodiment of the monitoring system in accordance with the present invention.

A further embodiment of the system 10 is depicted in FIG. 5 where the same reference numbers are used to denote the same or similar features described in previous embodiments. In this embodiment both an intake side of pump 13 and passage 28 are vented to ambient pressure via respective vents 19$_1$, 19$_2$ and inline filters 46$_1$ and 46$_2$. The fluidic circuit 14 is simplified in this embodiment comprising, in series from the pump 13: tube 32, filter 46$a$, passage 20, filter 46$b$, flow restrictor 24, tube 38, filter 46$c$, and passage 28, which then couples with the filter 46$_2$ and vent 19$_2$. Sensors 52 and 54 provide a measure of pressure in tube 32 (i.e. the source pressure) $P_S$ and the ambient pressure $P_A$ respectively.

The pump 13 is regulated to maintain a given pressure difference between the pressures $P_S$ and $P_A$. This difference is negative for vacuum applications $P_S<P_A$, and positive for over-pressure $P_S>P_A$.

For the description below, it is assumed that $P_S$ is regulated for vacuum (i.e. $P_S<P_A$).

Assume that there is no crack 58, the pressure difference between $P_S$ and $P_A$ drives an air flow from ambient through the vent 19$_2$, filter 46$_2$, ambient gallery 28, tube 38, flow restrictor 24 and (negatively) pressurized gallery 20 and tube 32 to the pump 13. In a steady state condition the pump 13 runs with a constant speed to keep the vacuum in tube 32 and gallery 20 constant by providing the required air flow for the flow restrictor 24.

When a crack 58 develops that extends from the passage 20 to the passage 28 (or indeed to any point at ambient pressure) the conductivity of the crack 58 provides an additional air flow. To maintain the vacuum the regulator will now increase the pump speed to provide the higher air flow required.

The speed of the pump 13 is a measure for the air flow. Setting an appropriate pump speed threshold, the pump speed in a non-crack condition is lower than the threshold. In a crack condition the pump speed is higher than the threshold.

The advantage of this system is that it uses the regulated speed of pump 13 not only for pumping but also to determine the air flow (and detect a crack 58). This pneumatic system is self-contained and requires no external pneumatic source elements.

The volumetric air flow pumped $\dot{V}_{PUMP}$, is proportional to the pump speed in rpm in accordance with:

$\dot{V}_{PUMP} = k \times rpm$ where $k$ is a constant for the pump's capacity

The mass flow $\dot{m}_{PUMP}$ is dependent on the air density $\rho$ at the pump intake port in accordance with:

$$\dot{m}_{PUMP} = \rho \times \dot{V}_{PUMP} = \frac{P_{PORT}}{RT} \times \dot{V}_{PUMP}$$

In case of vacuum application with $P_T < P_A$, the intake port is at $P_T$ and thus $P_{PORT} = P_T$.

In case of over-pressure application with $P_T > P_A$, the intake port is at $P_A$ and thus $P_{PORT} = P_A$.

$$\text{Vacuum application: } \dot{m}_{PUMP} = \frac{P_T}{RT} \times k \times rpm \qquad (8)$$

$$\text{Over-pressure application: } \dot{m}_{PUMP} = \frac{P_A}{RT} \times k \times rpm \qquad (8)$$

The relationship between the volumetric flow through a tube (e.g. the flow restrictor 24) and the pressure drop over the tube is described by the Poiseuilles' Law:

$$r_{24} = \frac{\Delta P 24}{\dot{V}_{24}} = \frac{8}{\pi} \times \mu \times \frac{l}{(ID/2)}$$

Replacing the flow resistance $r_{24}$ by their conductance $c_{24} = 1/r_{24}$ $$\text{Vacuum application: } \dot{V}_{24} = c_{24} \times \Delta P_{24} = c_{24} \times (P_A - P_T) \qquad (9)$$

$$\text{Over-pressure application: } \dot{V}_{24} = c_{24} \times \Delta P_{24} = c_{24} \times (P_T - P_A) \qquad (9)$$

Recall the density in the flow restrictor:

$$\dot{m}_{FR} = \frac{P_{FR2}}{RT} \times \dot{V}_{FR2} = \frac{P_A + P_T}{2RT} \times \dot{V}_{FR1}$$

Inserting this into equation (9):

$$\text{Vacuum application: } \dot{m}_{FR} = \frac{P_A + P_T}{2RT} \times c_{24} \times (P_A - P_T) \qquad (10)$$

$$= c_{24} \times \frac{P_A^2 - P_T^2}{2RT}$$

$$\text{Over-pressure: } \dot{m}_{FR} = \frac{P_A + P_T}{2RT} \times c_{24} \times (P_T - P_A) \qquad (10)$$

$$= c_{24} \times \frac{P_T^2 - P_A^2}{2RT}$$

In a steady state condition the mass flow in the pump (equation (8)) is equal to the mass flow in the flow restrictor (equation (10)), assuming there is no crack and no material leakage.

$$\dot{m}_{PUMP} = \dot{V}_{FR}$$

$$\text{Vacuum application: } \frac{P_T}{RT} \times k \times rpm = c_{24} \times \frac{P_A^2 - P_T^2}{2RT}$$

$$\text{Over-pressure application: } \frac{P_A}{RT} \times k \times rpm = c_{24} \times \frac{P_T^2 - P_A^2}{2RT}$$

Solving for $c_{FR}$ and cancelling RT $$\text{Vacuum application: } c_{24} = 2k \times \frac{P_T}{P_A^2 - P_T^2} \times rpm$$

$$\text{Over-pressure application: } c_{24} = 2k \times \frac{P_A}{P_T^2 - P_A^2} \times rpm$$

In case of a crack 58 the crack conductance $c_{CRACK}$ acts parallel to $c_{24}$. Therefore $c_{24}$ must be replaced by $(c_{CRACK} + c_{24})$. After solving for $c_{CRACK}$:

$$\text{Vacuum application: } c_{CRACK} = 2k \times \frac{P_T}{P_A^2 - P_T^2} \times rpm - c_{24}$$

$$\text{Over-pressure application: } c_{CRACK} = 2k \times \frac{P_A}{P_T^2 - P_A^2} \times rpm - c_{24}$$

Hence in this embodiment measured changes in pump rpm provides an indication of the integrity of the structure. The pump speed is regulated to maintain a substantially constant difference between the pressures $P_T$ and $P_A$. Any change in speed required to maintain this difference is indicative of the presence of a crack or other fault that is providing a fluid flow path from the passage 20 to ambient pressure.

In each of the embodiments described and depicted the fluidic circuits do not include any valves. This has great benefit when the system is to be used in harsh environment where valve are prone to failure or simply cannot meet environmental requirements, such as at high altitudes where temperatures may easily be in the vicinity of, or, below −55° C. Further benefit arises in that the system is able to also detect a blockage in a fluidic circuit which if not detected would give rise to spurious readings and/or assessments of structural integrity. To the knowledge of Applicant all prior system have required the use of valves to selectively connect and disconnect fluidic circuits to various meters, vents or stops in order to test continuity (ie for the existence of blockages) in the fluidic circuit. According embodiments of this invention are well suited, but not limited in application, to in flight testing of aircraft and airframes. This then enables detection of cracks well before they may be found in static on ground tests. When in flight aircraft are subject to dynamic loads that may sequentially open and close a crack. But when on the ground, in the absence of dynamic loading a crack may effectively close and thus be more difficult to detect.

The ability to detect blockages without the need for valves is provided by embodiments of the system 10 which produce a substantially constant and continuous fluid flow, so that a drop in air flow is indicative of a blockage whereas an increase in air flow is indicative of a crack.

Consider the embodiment of FIG. 1 and the related conductance equation (4) which is reproduced below:

$$c_{CRACK} = \frac{P_S^2 - P_T^2}{P_A^2 - P_S^2} \times c_{26} - c_{24} \quad (4)$$

With the flow restrictors 24 and 26 being matched and in the case when there is no crack 58 or no blockage, the value of $C_{crack}$ is near zero. This coincides with there being no change in the mass flow of fluid through the fluidic circuit 14.

In either a vacuum or over-pressure application, when one of the passages 20 or 28 is blocked the flow in flow restrictor 26 is very small and the pressure drop across it becomes very small, too. This means that $P_S$ becomes almost equal to $P_T$ and the nominator in equation (4) therefore becomes very small and $C_{crack}$ becomes negative.

A blockage of either passage results in a strong negative $C_{crack}$ number.

A real crack into passage 20 results in strong positive $C_{crack}$ number.

The purpose of the passage 28/28'a depicted in the embodiments of FIGS. 1-5 is to provide in effect an ambient pressure source to the first passage 20 should this not be available from outside of the sensor 48. When the passage 20 is in fluid communication with ambient pressure via a crack there will then be a change in the mass flow of air though the circuit 14 which will be detected by the system 10. The crack will of course be detected by the measured pressures and the calculation of crack conductance as hereinbefore described. The path to ambient pressure via the crack can be either to the passage 28/28'a which is part of the sensor 48, or alternatively depending on the direction of propagation of growth of the crack the path maybe to any point outside of the foot print of the sensor 48.

Usually a crack will grow in a known direction from a stress riser such as a hole, a fastener, sharp corner etc. Therefore the sensor 48 can be designed or orientated so that the passage 20 is the first intersected by a crack, which provides a leakage path to ambient pressure. As the crack propagates further it will then intersect the passage 28 which will provide a further leakage path to ambient pressure thereby changing the mass flow though the circuit 14, with the size of the crack being indicated by the calculated conductance. However, the sensor 48 maybe orientated so that the passage 28/28'a is the first passage intersected by a propagating crack. In this orientation the crack must grow a certain length into the ambient passage 28/28'a and then a further distance into the sensing passage 20.

Figure 6:
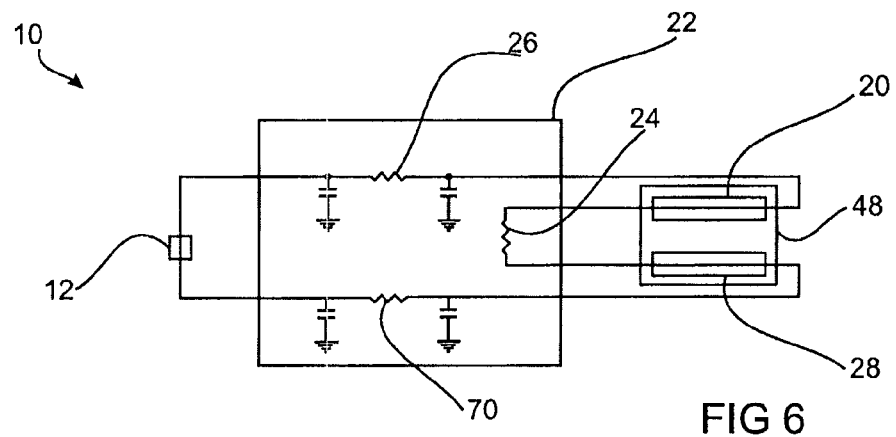
FIG. 6 is a schematic representation of a fifth embodiment of the monitoring system.

FIG. 6 depicts a further embodiment of the system 10. This embodiment is depicted in simplified form and differs from that shown in FIG. 1 by the addition of a further flow restrictor 70 connected in series between the passage 28 and the vent 19. The inclusion of the flow restrictor 70 now allows detection of a crack that intersects the passage 28a and extends to provide a fluid communication path to ambient pressure.

The table below shows the expected changes in pressure across the flow restrictors 26, 24 and 70 under the conditions of a blockage, a crack intersecting the passage 28 and providing a fluid communication to ambient pressure, a crack intersecting the top passage 20 and providing a fluid communication path to ambient pressure, and a crack bridging the 2 passages 20 and 28.

| CHANGE IN PRESSURE ACROSS | BLOCKAGE | PASSAGE 28 CRACK | PASSAGE 20 CRACK | BRIDGE CRACK |
|---|---|---|---|---|
| Restrictor 26 | ↓ | ↑ | ↑ | ↑ |
| Restrictor 24 | ↓ | ↓ | ↓ | ↑ |
| Restrictor 70 | ↓ | ↑ | ↓ | ↓ |

Figure 7:
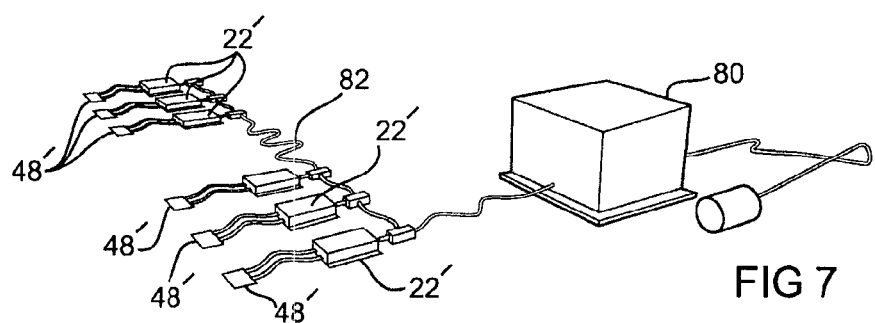
FIG. 7 is a schematic representation of an airborne monitoring system incorporating embodiments of the present continuous flow structural health monitoring system; and, FIG. 8 illustrates an alternate topology for an airborne monitoring system incorporating embodiments of the present continuous flow structural health monitoring system.

The measurement systems depicted in FIGS. 1-6 are shown with a single measurement module 22/22' and single sensor 48/48'a. However multiple measurement modules and sensors maybe used. FIG. 7 is a conceptual diagram of one possible airborne structural monitoring system comprising a plurality of measurement modules 22' and sensors 48'a. The modules 22' are connected to a common control module 80 by a system bus 82. The control module 80 comprises a power supply, data storage and a pressure source for the measurement modules 22' and sensors 48'a. An electronic controller inside the control module 80 may conveniently be an aerospace rated off-the shelf single board computer running an appropriately operating system such as Linux, Dos and VxWorks. The control module 80 communicates to all the measurement modules 22' and sensors 48'a on a multi-drop bus 82 and is the master control device on the network. The protocol may be a standardized protocol such as CAN, PROFIBUS or 1553 inherently supported by the single board computer. Measurement readings are received from the measurement modules 22' processed and then stored. A connector is routed to a convenient location where data maybe downloaded to a storage or other electronic device such a laptop computer or a USB memory stick. The pressure source will typically provide a pressure differential of between 10 kPa-20 kPa above or below ambient pressure and the system maybe able to supply approximately fifty measurement modules 22'.

FIG. 8 illustrates an alternate topology for an airborne structural monitoring system comprising a central module 90, a plurality of separate environmental modules 92, and a plurality of measurement modules 22/22'. The central module 90 differs from the control module 80 of FIG. 7 in that the central module 90 does not include a pressure source. Rather a pressure source is incorporated in each environmental module 92. One or more sensors 48/48'a would be connected to each measurement module, however for the sake of simplicity they are not shown in FIG. 8.

The central module provides a regulated supply voltage and communications for the environmental modules 92 and measurement modules 22/22' via electrical/communication buses 94; collects, processes and stores data; handles error messages and conditions in the system; and interfaces to the aircraft's structural health monitoring system.

The environmental modules 92 provide a regulated pressure source for their respective measurement modules 22/22'. Having separate environmental modules allows a subsystem (i.e. a group) of measurement modules 22/22' to be placed in regions or zones which are subjected to different environmental conditions such as in a pressurized cabin, non-pressurize fuselage, non-pressurized wing etc. The environmental modules 92 measure ambient temperature, pressure, humidity, acceleration and other environmental parameters/data.

The measurement modules 22/22' provide pneumatic connectors for single sensors or differential sensors or a chain of sensors, and take measurements of crack data and calculation of the crack conductivity.

Now that embodiments of the invention have been described in detail it will be apparent to those skilled in the art the numerous variations and modifications may be made without departing from the basic inventive concepts. For example the form or construction of the flow restrictors is not of importance to the embodiments, these may be made for example from lengths of small bore tubing, or sintered glass. The passages may be formed by providing grooves on the surface of a pad that is adhered to the structure or alternately the passages may be formed internally of the structure either simultaneously with the production of the structure or as a post production step. All such modifications and variations together with those obvious to a person of ordinary skill in the art are deemed to be within the scope of the invention the nature of which is to be determined by the above description and the appended claims.

The invention claimed is:

1. A continuous flow structural health monitoring system for a component or structure, the system comprising:
a pressure source providing a supply fluid at a regulated pressure difference relative to ambient pressure;
a fluidic circuit which is coupled at one end to the pressure source and open at an opposite end to ambient pressure, wherein the pressure source produces a substantially constant and continuous flow of fluid through the fluidic circuit, the fluidic circuit having a first passage constituted in part by a first surface portion of the component or structure; and
a measurement system that continuously monitors for perturbations in the substantially constant flow of fluid through the first passage to provide an indication of structural health of the component or structure.

2. The structural health monitoring system according to claim 1, wherein the monitoring system monitors for perturbations in the fluid flow by monitoring for a change in conductance of a fluidic load on the first passage.

3. The structural health monitoring system according to claim 2, wherein the measurement system facilitates calculation of conductance of a crack, $C_{crack}$, in the first surface portion that provides fluid communication between the first passage and ambient pressure, the measurement system facilitating calculation of the conductance of the crack on the basis of a difference between a known conductance of the fluidic load and a measured conductance of the fluidic load.

4. The structural health monitoring system according to claim 3, wherein the fluidic load comprises:
a first flow restrictor of a conductance $C_{24}$ in series connection in the fluidic circuit between the first passage and the opposite end of the fluidic circuit,
a second flow restrictor of a known conductance $C_{26}$ coupled to the first passage on a side opposite the first flow restrictor; and
wherein the measurement system measures a pressure $P_T$ between a pressure source and the second flow restrictor, a pressure $P_S$ between the second fluidic load and the first passage, and ambient pressure $P_A$ and provides a calculation of crack conductance $C_{crack}$ as:

$$C_{crack} = \frac{P_S^2 - P_T^2}{P_A^2 - P_S^2} \times C_{26} - C_{24}.$$

5. The structural health monitoring system according to claim 1, wherein the first passage comprises a groove or channel formed on a first surface of a sensor, wherein, when the first surface is sealed to the first surface portion the first groove or channel together with the first surface portion forms the first passage.

6. The structural health monitoring system according to claim 5, wherein the second passage comprises a second groove or channel formed on the first surface of the sensor, wherein, when the first surface of the sensor is sealed to the first surface portion, the second groove or channel forms the second passage.

7. The structural health monitoring system according to claim 1, further comprising a reference fluidic circuit coupled at one end to the pressure source and open at an opposite end to ambient pressure, wherein the reference circuit has fluidic characteristics matched to fluidic characteristics of the fluidic circuit; and wherein the measurement system utilizes pressure measurements in the reference circuit to provide common mode noise cancellation in monitoring for perturbations in the flow of fluid through the first passage and in calculation of conductance of the crack.

8. The structural health monitoring system according to claim 7, wherein the reference fluidic circuit comprises a reference passage of matched fluidic characteristics to the first passage, wherein the reference passage is located near the first passage and is in fluid isolation from the first surface portion of the component or structure.

9. The structural health monitoring system according to claim 8, wherein the measurement system provides a calculation of crack conductance as:

$$C_{crack} = C_{26} \times \left( \frac{P_{S1}^2 - P_T^2}{P_A^2 - P_{S1}^2} - \frac{P_{S3}^2 - P_T^2}{P_A^2 - P_{S3}^2} \right)$$

wherein $P_{S1}$ is a measured pressure between the second flow restrictor and the first passage;

$P_T$ is fluid source pressure;

$P_{S3}$ is fluidic pressure measured between the pressure source and the reference passage in the reference circuit; and $P_A$ is measured ambient pressure.

10. The structural health monitoring system according to claim 1, wherein the pressure source comprises a pump~ and the measurement system measures pump speed, wherein a variation in the measured pump speed provides an indication of a perturbation in fluid flow through the first passage.

11. The structural health monitoring system according to claim 10, wherein the fluidic load comprises a first flow restrictor of a conductance $C_{24}$ in series connection in the fluidic circuit between the first passage and the opposite end of the fluidic circuit.

12. The structural health monitoring system according to claim 11, wherein the measurement system measures fluidic source pressure $P_T$ and ambient pressure $P_A$ and calculates crack conductance as:

$$C_{crack} = 2k \times \frac{P_T}{P_A^2 - P_T^2} \times rpm - C_{24}$$

when $P_T < P_A$, and $$C_{crack} = 2k \times \frac{P_A}{P_T^2 - P_A^2} \times rpm - C_{24}$$

when $P_T > P_A$, and where rpm is the measured speed of the pump.

* * * * *